United States Patent

Faber

[15] 3,651,473

[45] Mar. 21, 1972

[54] EXPANDABLE INTERLOCK EXCHANGE FOR MULTIPROCESSING SYSTEMS

[72] Inventor: Ulbe Faber, Honeybrook, Pa.

[73] Assignee: Burroughs Corporation, Detroit, Mich.

[22] Filed: Mar. 27, 1970

[21] Appl. No.: 23,167

[52] U.S. Cl. ........................................................340/172.5
[51] Int. Cl. ....................................G06f 15/16, G06f 15/26
[58] Field of Search ...............340/172.5, 147 LP, 147 T, 166

[56] References Cited

UNITED STATES PATENTS

| | | | |
|---|---|---|---|
| 3,492,654 | 1/1970 | Fresch et al. | 340/172.5 |
| 3,311,795 | 3/1967 | Gilbert | 340/147 |
| 3,129,293 | 4/1964 | Warman | 340/166 X |

*Primary Examiner*—Paul J. Henon
*Assistant Examiner*—Ronald F. Chapuran
*Attorney*—Carl Fissell, Jr.

[57] ABSTRACT

This disclosure relates to an expandable interlocking exchange for a multiprocessing system that allows additional processors, memory modules and peripheral devices to be coupled to the exchange without incurring signal degradation and increased noise during data transfer. The exchange is a cross matrix of input-output buses or ports, for each of the accessing units, and interconnecting buses. Expansion is achieved by removing one of the accessing units from the exchange and employing the gates, which coupled that unit to the exchange, to couple the interconnecting buses to a new set of interconnecting buses to service the additional units.

10 Claims, 9 Drawing Figures

PRIOR ART

| TASK / TIME | 1 | 2 | 3 |
|---|---|---|---|
| $P_1$ | I/O CONTROL | PROCESS | PROCESS |
| $P_2$ | I/O CONTROL | PROCESS | PROCESS |
| $P_3$ | PROCESS | PROCESS | I/O CONTROL |
| $P_4$ | PROCESS | PROCESS | PROCESS |

INVENTOR.
ULBE FABER
BY
[signature]
ATTORNEY

INVENTOR.
ULBE FABER
BY [signature]
ATTORNEY

EXPANDABLE INTERLOCK EXCHANGE FOR MULTIPROCESSING SYSTEMS

BACKGROUND OF THE INVENTION

This invention relates to a multiprocessing system and more particularly to a switch interlock for such a system that will allow for expansion of this system as additional system capabilities are required.

Various types of systems architecture have been created to increase the capabilities of information processing systems. Multiprocessing systems have been devised with a plurality of processors and input/output controllers each of which is adapted to access one or more memory modules through an interlocking switching system. Such multiprocessing systems may be adapted to concurrently run different programs or to concurrently execute portions of one program where each of the processors is a general purpose processor. In other multiprocessing systems, each processor may be a special purpose processor adapted to implement particular functions such as matrix multiplication and inversion and so forth.

While both multiprocessing systems and single processing systems may be multiprogrammed, multiprocessing systems offer a plurality of advantages over a single processor system. Two particular advantages are those of reliability and availability. Greater reliability is achieved with a multiprocessing system having a plurality of similar units since the system can be programmed to provide graceful degradation. That is to say, should one of the units fail for some reason the system can continue to perform its tasks even though its operation is not at full capacity. An adjunct feature is that down time of the complete system is not required.

Not only does such increased reliability provide greater availability of processing time, but the multiplicity of a multiprocessing system also provides more available time. This latter advantage is particularly important in real time online operation such as would be required for reservation systems, remote terminal time sharing and the like. For greatest efficiency, the memory system should be completely shared by all the processors and the input-output control should be separate from the processors.

In order to accommodate the sharing of a plurality of memory modules or peripheral devices by two or more processors, some systems employ an interlocking exchange or switch interlock which consists functionally of a cross point switch matrix that effects the actual switching of bus interconnections. Such an interlocking exchange along with the provision of configuration-independent programs can provide for a totally modular system having efficient flexibility to handle a complete spectrum of processing tasks.

With the advent of dynamically changeable control stores and other microprogramming techniques, programmable units can be designed with instruction execution capabilities that can be altered to accommodate different problem or task requirements. A particular programmable unit having such characteristics is disclosed in the Faber et al. patent application Ser. No. 825,569, filed May 19, 1969 and assigned to the assignee of the present application. The programmable unit disclosed therein is under the control of plural levels of subinstruction sets or microinstruction sets. Since the instruction definitions of only the lowest subinstruction level is fixed by circuitry, the definitions of higher level subinstruction can be varied and different strings of microinstructions can be interchanged in accordance with the requirements of whatever program that is currently being executed. Thus, such a programmable unit may be employed at one time for control of input/output data transfers, at another time to execute a program written in a particular higher level program language and at still another time to execute a program written in still another program language. Because of the flexibility of such programmable units, two or more units can be employed in a multiprocessing system and additional units can be added to increase the capability of the system without regard for consideration of particular functions such as input/output control and the like.

While units of the type described accommodate the design of the system having various configurations and capabilities, the number of such units as well as the number of memory modules employed affected the design of the interlocking exchange by which such units and memory modules were interconnected. Such an interlocking exchange is primarily a matrix through which any accessing unit can address any memory module. It will be appreciated that as the respective interconnecting buses are extended to accommodate additional modules and units, noise introduction and signal degradation begin to occur. These factors must be considered not only in the original design of any configuration but also in attempting to expand a system once its fabrication has been completed.

It is therefore an object of the present invention to provide an expandable interlocking exchange for a multiprocessing system.

It is another object of the present invention to provide an improved interlocking exchange for a multiprocessing system by which additional processing units and memory modules may be added as required.

It is a further object of the present invention to provide an improved interlocking exchange for a multiprocessing system the interconnecting buses of which may be extended without the attendant noise introduction and signal degradation,

SUMMARY OF THE INVENTION

It will be understood that the present invention is directed to an interlocking exchange of matrix type where the input buses and output buses from the respective units are coupled to interconnecting buses by switching gates, one gate for each connector in the bus. With this type of exchange, the above stated objects are accomplished by replacing the input and output buses for one of the units with a pair of expansion buses coupled to the disconnected sets of gates which expansion buses are coupled to input and output gates of a new set of interconnecting buses to which additional processor and memory units are to be connected. It will be understood that the gates connected to the expansion buses are amplifiers as are all gates and thus the necessary amplification is provided for the expanded exchange to prevent signal degradation.

A feature, then, of the present invention resides in an expanded interlocking exchange for a plurality of processor and memory units having two or more sets of interconnecting buses, each but comprising a plurality of conductors to which are connected individual sets of input and output gates the number of such sets being one greater than the number of units coupled to each set of interconnecting buses and connective means to connect each of the additional output gates of the first set of interconnecting buses to the corresponding input gates of the second set of interconnecting buses.

With this feature, an interchange for a prescribed number of units can be designed and, should a larger number of units be required, or later expansion desired, one of the units can be disconnected from the interchange and the connection to a new set of interconnecting buses can be made.

Specific features of the present invention reside in the line drivers which serve as output gates from their respective units and sensing gates which serve as input gates to the respective units.

DESCRIPTION OF THE DRAWINGS

The above and other objects, advantages and features of the present invention will become more readily apparent from a review of the following specification when taken in conjunction with the drawings wherein.

GENERAL DESCRIPTION OF THE SYSTEM

Figure 1:
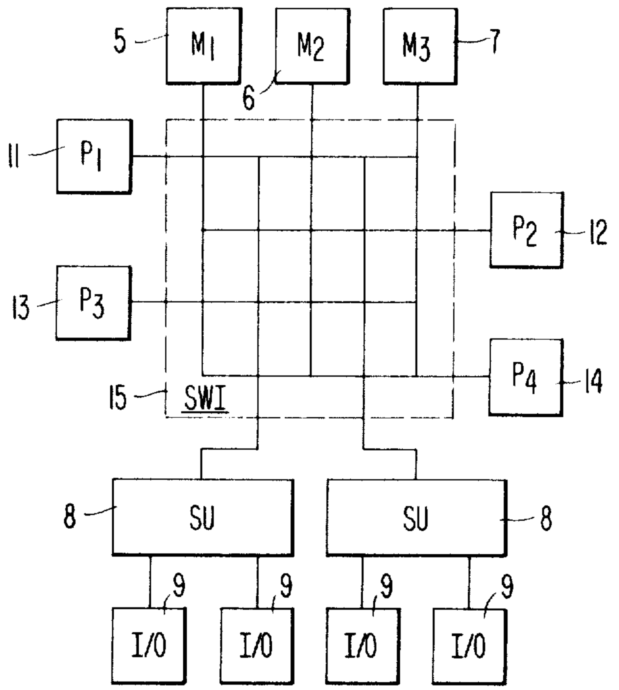
FIG. 1 is a diagrammatic representation of prior art switching exchanges.

A particular multiprocessing array is illustrated in FIG. 1 wherein a plurality of programmable units 11, . . . , 14 are connected through switch interlock 15 which also connects to memory units 5, 6, and 7 as well as to a plurality of input-output devices 9 which are coupled to the array by switching units 8. The respective programmable units 11, . . . , 14 may be of the type described in the above-referred-to Faber et al. application which are adapted to be placed in different modes in accordance with the job requirements of the system. Thus, as illustrated in the table accompanying FIG. 1, units 11 and 12 may be placed in an input-output control mode during a particular task time while units 13 and 14 would operate in the process mode. At a later task time when no input-output operations are required, all four units would be placed in a process mode. At still a later task time when further input-output operations are required, one of the units in the array such as unit 13 would be placed in input-output control mode. The purpose of the table accompanying FIG. 1 is merely to illustrate that any one or all of the programmable units can be placed in either input-output control mode or in a process mode according to the requirements of the application to which the system is put. The interconnecting exchange or switch interlock 15 is fixed in circuitry and cannot be altered without redesign.

Figure 2:
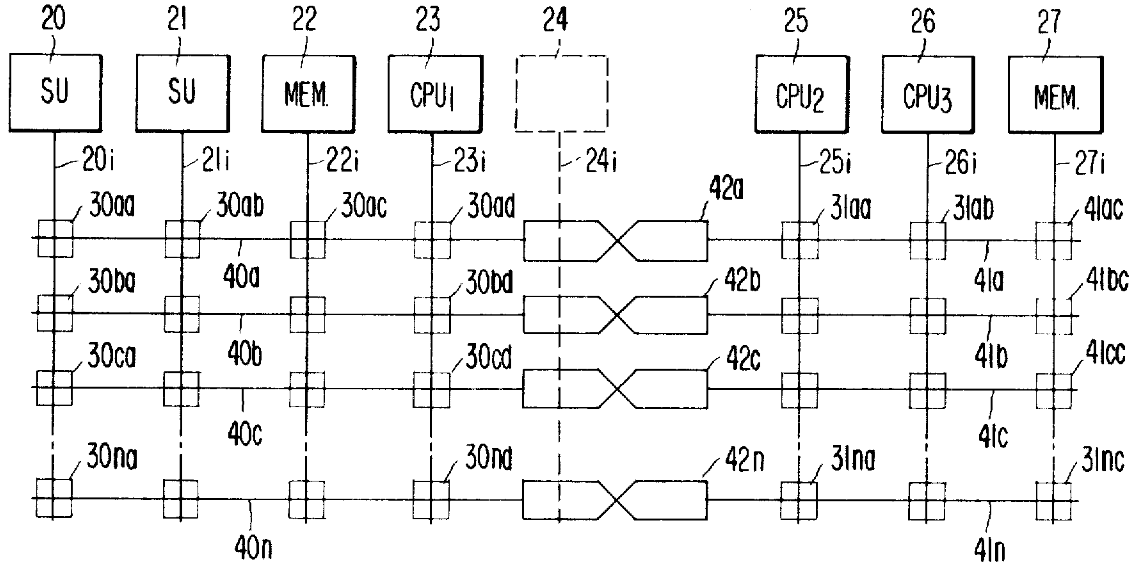
FIG. 2 is a diagrammatic representation of a switching exchange of the present invention.

As distinct from the interlocking exchanges shown in FIG. 1, FIG. 2 illustrates an interlocking exchange of the present invention which may be expanded to accommodate additional units when so required. In FIG. 2 there is shown an expanded system which initially included I/O switching units 20 and 21, memory unit 22 and processing unit 23 and 24. In accordance with the present invention one of the units such as processing unit 24 was removed from the system to allow for the expansion to include new processing units 25 and 26 as well as additional memory unit 27. Each of the initial units in the system are provided with input output buses **20*i*, . . . 24*i* respectively and the additional units 25–27 are similarly provided with input output buses 25*i*, . . . , 27*i*. The input output buses are coupled together by way of a cross bar switching unit formed by interconnecting buses 40*a*, . . . , 40*n*, the interconnection being by way of gate circuits 30*aa*, . . . , 30*ne*. After expansion of the system, the respective interconnecting buses are extended which extensions are represented in FIG. 2 by buses 41*a*, . . . , 41*n*. In accordance with the present invention, the extended buses are coupled to the interconnecting buses by way of coupling circuits 41*a*, . . . , 42*n* in a manner which will be more fully described below. Gate circuits 30*al*, . . . , 30*ne* are not illustrated in FIG. 2 since they are employed in the present invention to form a portion of the coupling circuits 42*a*, . . . , 42*n* once one of the units (unit 24) and its corresponding input output bus 24*a*** have been removed from the circuit to accommodate the expansion of the system.

DETAILED DESCRIPTION OF THE EXPANDED SYSTEM

Figure 3:
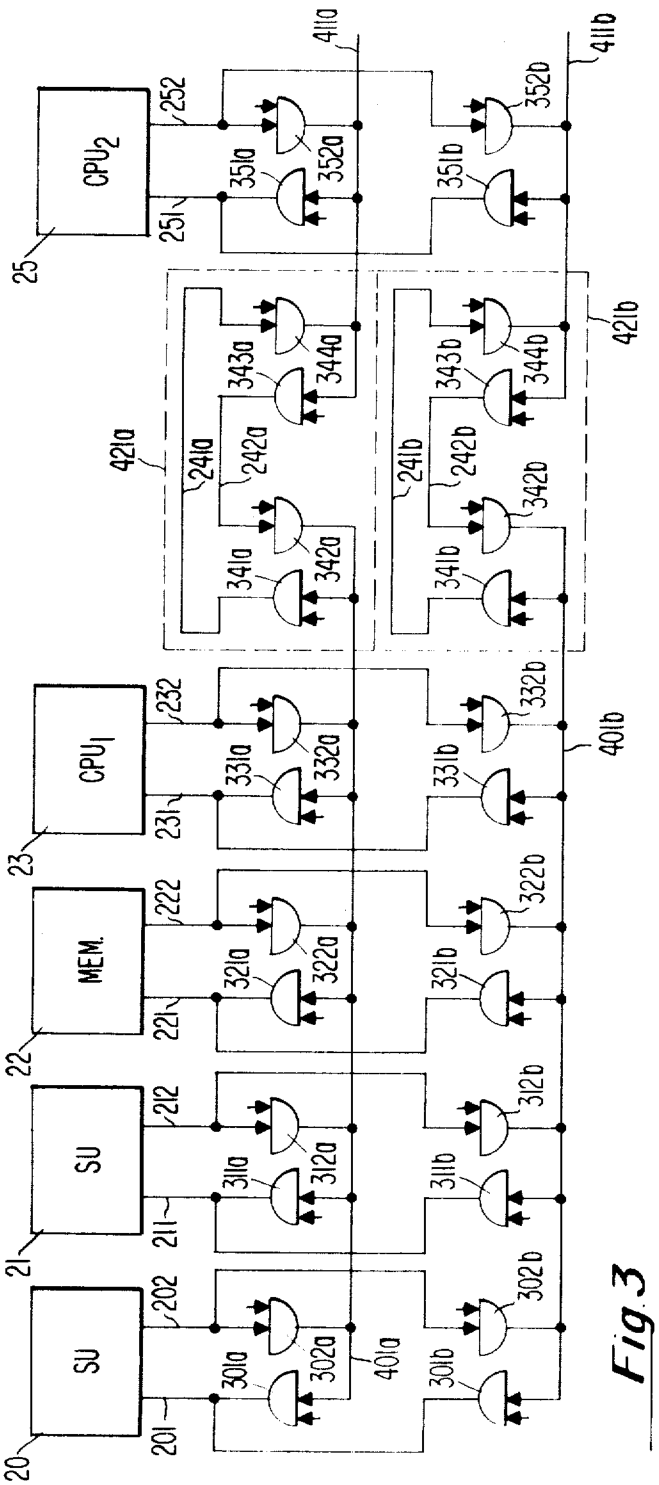
FIG. 3 is a schematic representation of a system employing the present invention.

Particular circuitry of the expanded system is illustrated in FIG. 3 which comprises a plurality of switching, memory and processing units of the type illustrated in FIG. 2. While only one connector of each of the respective buses is disclosed in FIG. 3, it will be understood that similar gate connections will be provided for interconnecting the respective conductors of the different buses where so required as illustrated generally in FIG. 2. Thus, while AND gates **301*a* and 302*a* are illustrated in FIG. 3 to connect conductors 201 and 202 respectively to conductor 401*a*, it will be appreciated that conductor 201 is but one of many conductors which form the input portion of input output bus 20*i* of FIG. 2 and similarly, conductor 202 is but one of many conductors which form the output portion of input output bus 20*i*. In a corresponding fashion, conductor 401*a* is but one of many conductors which form the interconnecting bus 40*a* of FIG. 2. In a like manner, conductor 401*b* is representative of but one conductor of interconnecting bus 40*b*** in FIG. 2 and so forth.

In accordance with the present invention, expansion of the interlocking exchange is accommodated by removing an accessing unit (unit 24) and its corresponding input output bus from the exchange. However, the gate circuitry which connected that input output bus to the respective interconnecting buses is retained to form the respective coupling circuits **42*a*, . . . , 42*n* which connect to the new interconnecting buses or extended buses 41*a*, . . . , 41*n*. Thus, as illustrated in FIG. 3, gates 341*a* and 342*a* as well as gates 341*b* and 342*b* were respectively employed to couple interconnecting conductor 401*a* and 401*b* to respective conductors of input output bus 24*i* of FIG. 2. In the expanded system, however, gate 341*a* which was formerly an input gate is now coupled by way of expansion conductor 241*a* and output gate 344*a* to bus extension 411*a*. Similarly gate 342*a* which was formerly an output gate is adapted to receive signals from extended bus 411*a* by way of input gate 343*a* and expansion conductor 242*a*. Similar coupling circuits will be provided for coupling each of the conductors of bus 40*a* to extension bus 41*a* and also between the corresponding conductors of each of the other interconnecting and extended buses such as indicated schematically in FIG. 3 by coupling circuit 421*b* which has similar gate conductors corresponding to those of coupling circuit 421*a***.

It will be appreciated that each of the interconnecting buses is coupled to both the input portion and the output portion of the input output bus since only two units will be connected to a particular interconnecting bus at a time one of which units will be transmitting and the other of which will be receiving.

Figure 4:
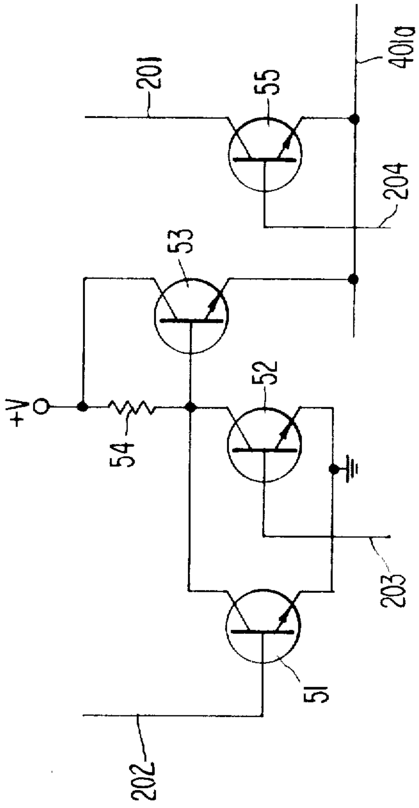
FIG. 4 is a schematic representation of switching gates such as employed in the present invention.

A better understanding of the present invention will be obtained from a review of FIG. 4 which illustrates a pair of input and output gates of the type contemplated for the present invention. A representative input gate to an addressed unit would be implemented such as by transistor 55 in FIG. 4 since the purpose of the input gate is merely to sense a signal on interconnecting bus conductor **401*a*. On the other hand, an output gate to the interconnecting bus conductor must be a driver and, as illustrated in FIG. 4, would be formed of transistor 51, 52 and 53**.

In this configuration, transistor 53 is adapted in an emitter follower configuration that follows the base voltage which when high would create a high voltage level on conductor **401*a*. This condition would exist when neither of the transistors 51 or 52 is conducting thereby causing the collector and base of transistor 53 to be at the same positive potential. Under this condition, a high voltage signal received from conductor 202 and supplied to the base of transistor 51 would render transistor 51 conductive thereby lowering the voltage supply to the base of transistor 53 and rendering transistor 53 nonconductive. Conversely a high signal supplied from conductor 203 to the base transistor 52 would have the same effect. With this configuration, transistor 52 is employed to condition the output gate whenever a low voltage signal is supplied to conductor 203 thereby allowing a signal on conductor 202 to be applied to interconnecting bus conductor 401*a* (although in an inverted form). A high voltage signal supplied to conductor 203 will isolate the signal information line 202** from the interconnecting bus conductor.

The input gate to an addressed unit formed of transistor 55 would normally be nonconducting when a low voltage signal is supplied to the base of transistor 55 by way of conductor 204. Thus, a high voltage signal supplied to conductor 204 would render transistor 55 conductive to condition it to sense and transmit any voltage variation from interconnecting bus conductor 401*a* to input conductor 201 by sensing the current in conductor 201.

Figure 5:
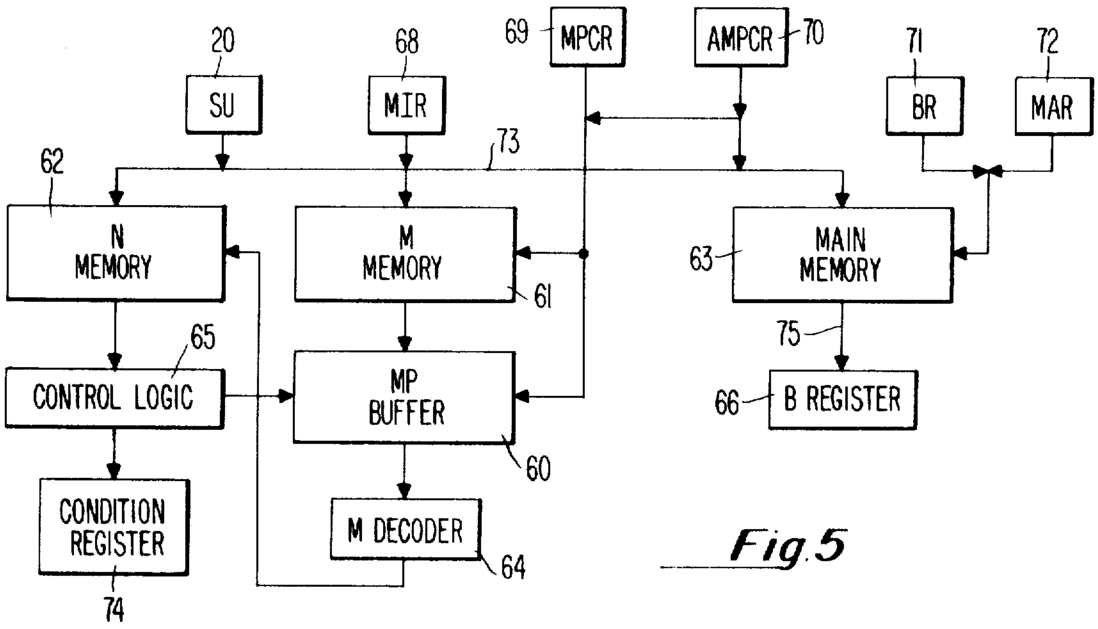
FIG. 5 is a schematic representation of a processor interface such as might be employed with the present invention.

It will be appreciated that selection of the respective set of gates required to complete the interconnection between one of the addressing units and an addressed unit (a memory module) will be in accordance with the supervisory or executive program for the system. Before describing this addressing format, a brief description will first be given of the memory processor interface for a processor such as the type described in the above referred to Faber et al. application. FIG. 5 illustrates such an interface between the processor and the respective memories as well as with the processors and control units which might be included within the system. As shown therein, three separate memories are provided including main memory 63, a first level of subinstruction or M instruction memory 61, and a second level subinstruction or N instruction memory 62. M memory 61 and N memory 62 would normally be contained within the processor and one or more main memories 63 would be connected to the processor by way of the switch interlock of the present invention. N memory 62 may be replaced by logic circuitry. Main memory 63 serves to provide data and macro-instructions to input register 66 of the processor. M memory 61 serves to provide micro-instruction strings directly to the processor or by way of micro-program buffer 60. Such M instruction strings are retrieved in accordance to the execution of a macro-instruction by the processor and each of the micro-instruction is retrieved from MP buffer 60 in sequence for execution by M decoder 64. In response to the decoding of an M instruction, an N instruction is retrieved from N memory 62 and placed in the control logic 65.

N memory 62 is addressed by the M decoder 64. M memory 61 is addressed by either micro-program count register 69 or the alternate micro-program count register 70 under control of N memory control logic 65 and condition register 74. Main memory 63 is addressed by memory address register 72 and base register 71. All of these registers are located within the processor.

In addition, micro-program buffer 60 may be addressed either by micro-program count register 69 or the alternate micro-program count register 70 when a micro-instruction is required to be fetched out of sequence. Otherwise, the selections from micro-program buffer 60 are made in sequence in response to signals from control logic 65 and dependent upon certain conditional signals which exist in condition register 74. Data and other information such as instruction strings may be supplied to any one of the three memories from the processor by way of information register 68 or the alternate micro-program count register 70. In addition, information may be supplied to any one of the three memories by way of switching unit 20 to which peripheral devices are connected or from other processors in the system. With the configuration thus described, bus 73 would correspond to one of the interconnecting buses 40*a*, . . . , 40*n* of FIG. 2.

Having described the interface between a processor and the other units of a multiprocessing system, the manner in which such a processor might address such other units for data transfer by way of the interlocking exchange of the present invention will now be described. The formats for different levels of control information of a processor described in the above-referred-to Faber et al. application are illustrated in FIGS. 6–9. As represented therein, there are four sources of control information employed by this particular programmable unit. These sources include three levels of instructions, namely, the S instruction, the M instruction, and the N instruction and also include a set of conditional bits placed in the condition registers 74 as illustrated in FIG. 5.

Figure 6:
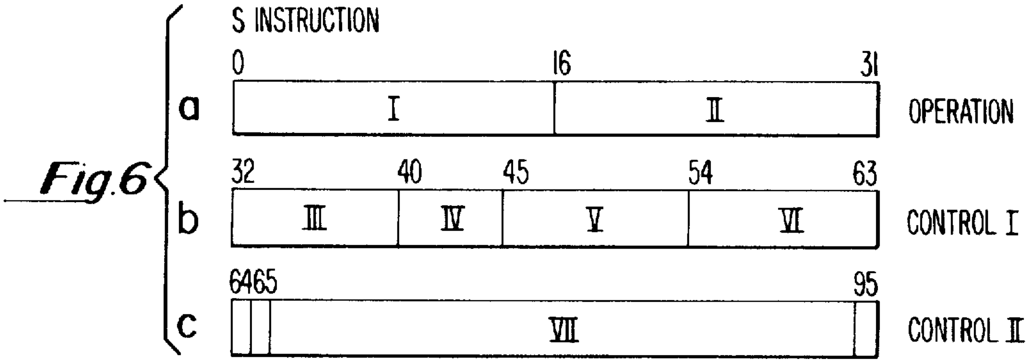
FIG. 6 is a representation of an I/O instruction format for a processor interface of FIG. 5.
Figure 7:
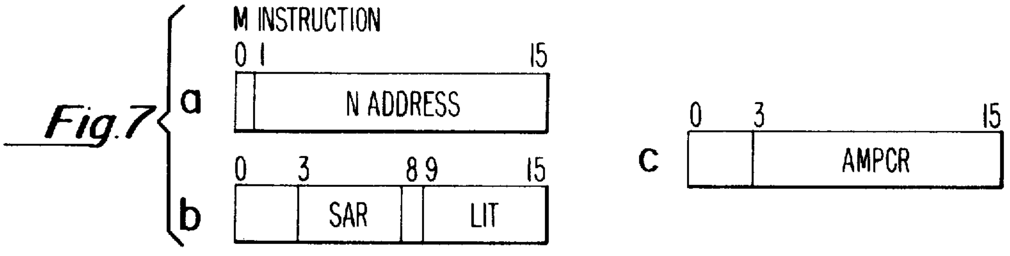
FIG. 7 is a format of addressing commands for a processor interface of FIG. 5.

Referring now to FIG. 6, the particular macroinstruction formats illustrated in FIGS. 6*a*, 6*b* and 6*c* are adapted for the control of input-output data transfers which are described herein because they are typical data transfers over the interlock exchange of the present invention. It will be understood that there will be a variety of macroinstruction operations that are not relevent to data transfer over the interlocking exchange.

The input-output descriptor of FIG. 6 comprises 96 bits arranged in three segments. The operation segment of FIG. 6*a* is divided into two fields. Field I specifies the operation to be performed while Field II may be employed to specify the address of the peripheral device or the particular memory module to or from which data is to be transferred. Field III of FIG. 6*b* is a character of eight bits which may be used as a comparison character to terminate a data transfer. Field IV constitutes a counter which specifies the number of data segments to be transferred, which count is to be decremented by one and tested for zero on each data transfer. Field V is a set of control bits such as flags which may be used to modify the data transfer or specify various conditions. Field VI is an instruction counter which specifies the absolute address from which the next descriptor operation is to be obtained. Field VII of the Control II segment of FIG. 6*c* is employed to specify the address in memory to or from which the data is transferred. Field VII may be divided into subfields to specify, for example, a base address and a relative address position. In the Control II segment, bit 64 is employed to specify that the current channel whose operation is governed by the descriptor is busy, and bit 65 is employed to prohibit the current descriptor from initiating a new I/O sequence on another channel.

This descriptor format is implemented by the particular processor upon receipt of Field I by B register 66 of FIG. 5 from which this field is transferred to AMPCR 70 to form an address to access M memory 61 to fetch the microinstruction string required to establish the interlock across the interlocking exchange of the present invention.

Each M instruction requires one 16-bit word of storage in micro-program memory 61. There are two types of M instructions each of which are differently decoded by a lower level of instructions or N instructions. The first type of M instruction is represented by the format of FIG. 7*a*. In this format, the zero bit is one and the remaining bits specify an N memory address at which may be found the appropriate N instruction which contains the operation and condition control bits specified by this first type of M instruction. The second type of M instruction is represented by the formats of FIG. 7*b* and 7*c*. This type of instruction only contains data or information literals such as a new M memory address to be transferred to AMPCR 70 (FIG. 7*c*) or shift amount and other literal values (FIG. 7B). In both cases the first significant bit is a zero. It is only the first type of M instruction as represented by FIG. 7*a* that is relevent to the implementation of the I/0 descriptor for memory and device operations.

The memory and device operations under the control of M instructions are employed to transfer data between the processor and any of the memory modules or peripheral devices coupled to the interlocking exchange of the present invention. The processor is connected to this interlocking exchange by bi-directional buses as illustrated in FIG. 3 and also in FIG. 5. In FIG. 5, the output bus would be bus 73 while the input bus to the processor would be bus 75. Memory and device addresses are transferred from the processor's memory address register 72 to the interlocking exchange and after connection, onto the selected memory or device. Data received from a memory or device is placed in B register 66 by designating the B register to the external data bus. Data transferred to a memory or device is sent by way of memory information register 68. Each memory or device operation is initiated in the first clock period of the M instruction and continued in parallel with subsequent M instruction executions. This overlap is accommodated by the implementation of an M instruction during three time phases.

Figure 8:
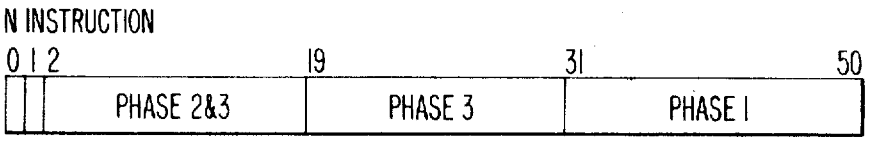
FIG. 8 is a format of control signals for a processor interface of FIG. 5.

FIG. 8 represents the format of an N instruction fetched from N memory 62 and placed in control logic 65 upon the decoding of an M instruction by M decoder 64 as illustrated in FIG. 5. The N instruction format comprises control signals which signals are not generated directly by circuitry but are stored in the N memory. These control signals comprise those signals to be employed during phase 1 of an M instruction execution, those control signals to be employed during phases 2 and 3 and those control signals to be employed during phase 3.

The control signals implemented during phase one are employed during memory and device operation to test for conditions in condition register 74 and also to initiate the memory and device operation, which operation is carried out during phase 3 when the respective control signals are sent to the appropriate gates in the processor to transfer the device address from B register 66 of FIG. 5 to memory address register 72. It will be remembered that Fields I and II were initially transferred to B register 66 to initiate the I/O operation which was accomplished by the transfer of Field I from B register 66 to address M memory 61. As a result of this initiation by way of execution of the respective M instructions, Field II of the descriptor is then transferred from B register 66 to MAR register 72 as described above.

Figure 9:
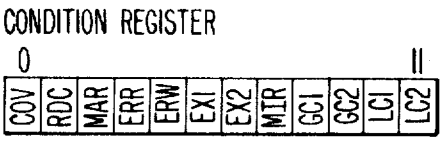
FIG. 9 is a format of condition signals for a processor interface of FIG. 5.

FIG. 9 discloses the format of the condition register and illustrates a set of 12 condition bits which are tested during phase 1 of an M instruction execution. These bits act as error indicators, interrupts, and local variables and lock out indicators as required to establish an interlock to a memory module or peripheral device by way of the interlock exchange of the present invention. Some of the more important conditions bit are described as follows. Read complete bit (RDC) is a bit which indicates that data is available to be clocked into B register 66 of FIG. 5. Memory address register ready bit (MAR) is a bit which indicates that the MAR 72 of FIG. 5 may be reloaded. Error in device or memory module for read (ERR) is a bit which indicates what an error has been detected in the memory module or device attached to the programmable unit for a read operation. Error bit (ERW) is similar to error bit (ERR) except that it is associated with a memory or device write operation. External request bits (EXI and EXII) are bits which indicate a new request from an external device or another programmable unit. MIR ready bit (MIR) indicates that data has been received by a memory or device after a write operation. Global condition bits (GCI and GCII) serve to indicate a successfully performed interlock by way of the interlock exchange of the present invention.

When all the relative conditions have been successfully tested, the contents of MAR 72 of FIG. 5 are then employed to condition the relevent gates of FIG. 3 to establish the desired interlock.

As thus described, the present invention is adapted to accommodate an expandable multiprocessing system including a plurality of memory modules that may be independently accessed by two or more processors or peripheral devices. When it is desired to expand this system to accommodate additional memory modules, processors or I/O channels, one of the units coupled to the exchange and its corresponding input-output buses are decoupled from the exchange and the switching gates which were connected to the removed buses are coupled to extended interconnecting buses by appropriate expansion circuits. Additional units can then be connected to the extended interconnecting buses. Since the gates which form the expansion circuits are amplifiers, the expansion of the system is achieved without adjunct signal degradation or increased noise in the circuits.

While one particular embodiment of the present invention has been described and illustrated, it will be apparent to those skilled in the art that changes and modifications may be made therein without departing from the spirit and scope of the invention as claimed.

What is claimed is:

1. An interlocking exchange for a plurality of accessing units of an information processing system, said exchange comprising:

sets of input buses and output buses, each set being coupled to one of said accessing units;

at least two interconnecting buses, one of said interconnecting buses being selectively coupled to the sets of input buses and output buses of certain of said accessing units, the second interconnecting bus being selectively coupled to the sets of input buses and output buses of the remaining accessing units; and sets of input gates and output gates to respectively selectively couple each of said input buses and output buses to its corresponding interconnecting bus, the number of said sets of input gates and output gates coupled to each interconnecting bus being one greater than the number of accessing units coupled to that bus, the additional set of input gates and output gates of one interconnecting bus being coupled to the additional set of input gates and output gates coupled to the other interconnecting bus.

2. An interlocking exchange according to claim 1 wherein:

each of said buses include a plurality of conductors; and each conductor of said interconnecting buses is coupled by said input gates and output gates to a corresponding conductor in each of said input buses and output buses.

3. An interlocking exchange according to claim 1 wherein the additional set of input gates of one of the interconnecting buses is coupled to the additional set of output gates of the other interconnecting bus.

4. An interlocking exchange according to claim 1 wherein:

each output gate coupling an output conductor to an interconnecting conductor is a driver circuit including a transistor connected as an emitter follower.

5. An interlocking exchange according to claim 4 wherein:

said driver circuit further includes an input transistor and a conditioning transistor coupled to the base of said emitter follower.

6. An interlocking exchange according to claim 1 wherein said input gates coupling said input conductors to said interconnecting conductors is a sensing circuit to sense voltage changes on said interconnecting conductor.

7. An information processing system comprising:

a plurality of accessing units;

sets of input buses and output buses, each set being coupled to one of said accessing units;

at least two interconnecting buses, one selectively coupled to the sets of input buses and output buses of certain of said accessing units, the second interconnecting bus being selectively coupled to the sets of input buses and output buses of the remaining accessing units; and amplifier coupling circuits to selectively couple one of said interconnecting buses to the other interconnecting bus.

8. An information processing system according to claim 7 wherein:

said accessing units include one or more memory units, one or more processing units, and one or more peripheral devices.

9. An information processing system according to claim 7 wherein:

each interconnecting bus is selectively connected to both the input bus and the output bus of each of said corresponding accessing units.

10. An information processing system according to claim 7 wherein said coupling circuits include sets of input gates and output gates for each of said interconnecting buses where the input gates of one interconnecting bus are coupled to the output gates of said other interconnecting bus.

* * * * *